(12) United States Patent
Hanchett et al.

(10) Patent No.: US 11,970,114 B2
(45) Date of Patent: Apr. 30, 2024

(54) SYSTEM FOR CAPTURING AND PRESENTING REAR AND SIDE VIEWS OF A VEHICLE

(71) Applicant: Atlis Motor Vehicles, Inc., Mesa, AZ (US)

(72) Inventors: Mark Hanchett, Mesa, AZ (US); Matt Wilkins, Portland, OR (US); Sean Lamont, Fort Myers, FL (US); Derek Duff, Apache Junction, AZ (US); Benoit le Beourgeois, Mesa, AZ (US)

(73) Assignee: ATLIS MOTOR VEHICLES INC., Tempe, AZ (US)

( * ) Notice: Subject to any disclaimer, the term of this patent is extended or adjusted under 35 U.S.C. 154(b) by 336 days.

(21) Appl. No.: 17/349,339

(22) Filed: Jun. 16, 2021

(65) Prior Publication Data

US 2022/0258670 A1 Aug. 18, 2022

Related U.S. Application Data

(60) Provisional application No. 63/093,619, filed on Oct. 19, 2020, provisional application No. 63/055,723, filed on Jul. 23, 2020.

(51) Int. Cl.
  *B60R 1/12* (2006.01)
  *B60R 11/04* (2006.01)
  *H04N 5/225* (2006.01)
  *H04N 23/54* (2023.01)

(52) U.S. Cl.
  CPC ............... *B60R 1/12* (2013.01); *B60R 11/04* (2013.01); *H04N 23/54* (2023.01); *B60R 2001/1253* (2013.01); *B60R 2300/105* (2013.01); *B60R 2300/30* (2013.01); *B60R 2300/802* (2013.01)

(58) Field of Classification Search
  CPC ... B60R 1/12; B60R 11/04; B60R 2001/1253; B60R 2300/105; B60R 2300/30; B60R 2300/802; B60R 2300/101; B60R 2300/70; B60R 1/28; H04N 23/54; H04N 5/2624; H04N 23/69; H04N 23/80; H04N 23/90
  See application file for complete search history.

(56) References Cited

U.S. PATENT DOCUMENTS

| | | | |
|---|---|---|---|
| 10,999,559 B1* | 5/2021 | Pertsel | B60R 1/26 |
| 2011/0074916 A1* | 3/2011 | Demirdjian | H04N 23/90 348/E13.001 |
| 2016/0196748 A1* | 7/2016 | Yellambalase | G08G 1/166 340/435 |
| 2018/0154831 A1* | 6/2018 | Spencer | H04N 23/90 |

* cited by examiner

*Primary Examiner* — Howard D Brown, Jr.
*Assistant Examiner* — Tyler B Edwards
(74) *Attorney, Agent, or Firm* — IPTechLaw

(57) ABSTRACT

A system for capturing and presenting views of a vehicle. In an example embodiment, the system captures video data rearward and along a side of the vehicle and/or behind the vehicle. The system includes video cameras for capturing video data at one or more resolutions and in one or more fields-of-view. The displays present the video data to the driver for use during operation of the vehicle. The displays present the video data at one or more resolutions. The resolution of capture and/or display may be in accordance with an operating mode of the vehicle, such as turning, direction of travel and/or driver selection.

12 Claims, 10 Drawing Sheets

SYSTEM FOR CAPTURING AND PRESENTING REAR AND SIDE VIEWS OF A VEHICLE

BACKGROUND

Embodiments of the present invention relate a system for capturing and presenting rear and side views of a vehicle to a driver for operation of the vehicle.

Cameras and one or more displays may be used in place of side view and rear-view mirrors on a vehicle, and in particular an electric vehicle. Vehicle drivers may benefit from cameras that capture images (e.g., video images, video data) rearward and along a side of the vehicle and/or behind the vehicle for viewing by the driver while operating the vehicle.

SUMMARY

Some of the various embodiments of the present disclosure relate to a system for providing rear and side views of a vehicle. In an embodiment, the system includes one or more cameras and one or more displays. The one or more cameras capture video data rearward and along a side of the vehicle and/or behind the vehicle. The displays present the video data to the driver of the vehicle. The driver of the vehicle may use the video data presented on the displays to identify other vehicles or objects along the side or behind the vehicle. The system may be used to replace the rear and side view mirrors of a conventional vehicle.

In an example embodiment, video data may be captured by a camera at one resolution and presented at the same resolution on the display. In another example embodiment, the video data may be captured by a camera at a first resolution and a second resolution with the second resolution being greater than the first resolution. The camera may capture the video data at the second resolution while a turn indicator is active and/or when the vehicle is operating in a reverse gear. At other times the camera may capture the video data at the first resolution.

In an example embodiment, video data captured by the camera at a first, lower resolution is presented on a first display. Video data captured by the camera at a second, higher, resolution is presented on a second display. The display area of the second display may be greater than the display area of the first display. In another example embodiment, the video data captured by the camera at the lower resolution is presented on a first portion of the display area of the display. Video data captured by the data at the higher resolution is presented on a second portion of the display area. The second portion is greater than the first portion.

The displays are adapted to be positioned in the vehicle. The displays are adapted to be oriented so the driver may view the data presented on the displays. The displays may be positioned in the vehicle at locations that are natural for the driver to look to receive specific information. For example, a display that presents rear-view video data may be positioned at the location where a rear-view mirror is normally located. A display that presents video data rearward and along a right side of the vehicle may be positioned to a right side of the steering wheel. I display that presents video data rearward and along a left side of the vehicle may be positioned to a left side of the steering wheel.

In an example embodiment, the driver may operate a control to instruct a camera to capture data at a higher resolution.

BRIEF DESCRIPTION OF THE DRAWING

Embodiments of the present invention will be described with reference to the figures of the drawing. The figures present non-limiting example embodiments of the present disclosure. Elements that have the same reference number are either identical or similar in purpose and function, unless otherwise indicated in the written description.

DETAILED DESCRIPTION

Overview

Figure 1:
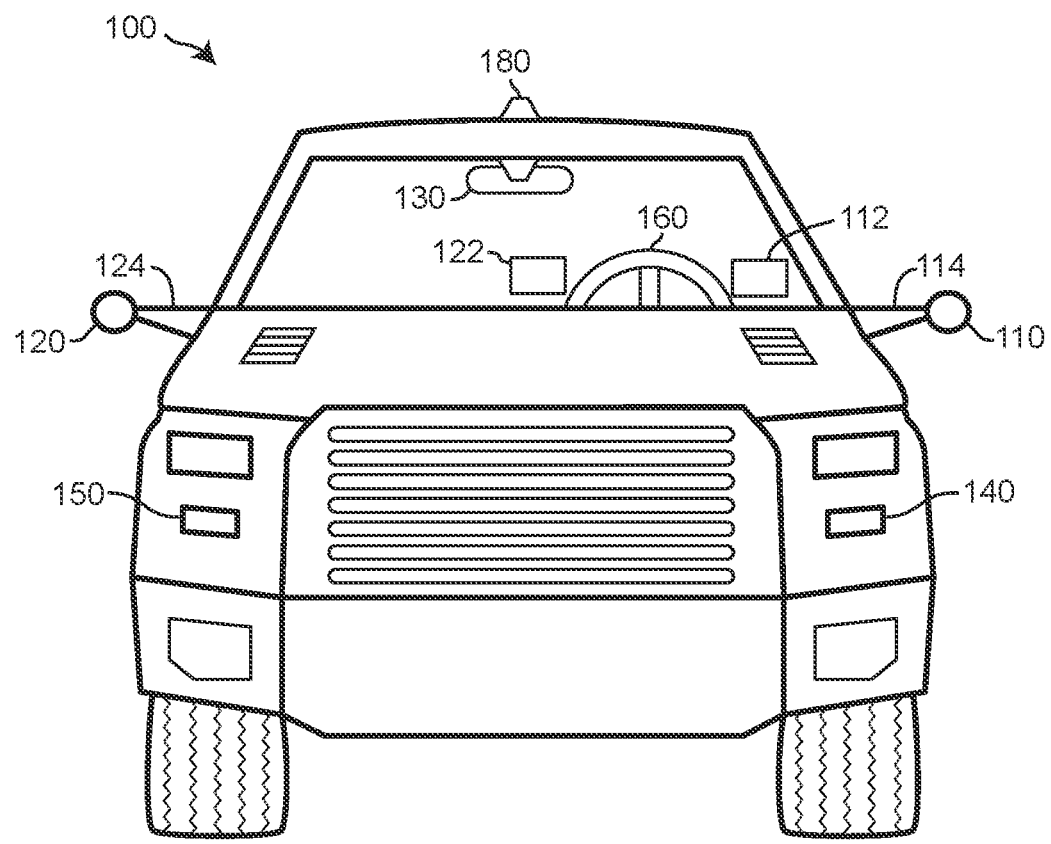
FIG. 1 is an example embodiment of the system for providing rear and side views of a vehicle.

Conventional vehicles generally include a rear-view mirror and side (e.g., side view) mirrors so the driver (e.g., user, operator) may see behind and to the sides of the vehicle while facing forward. Rearview and side mirrors may be replaced by cameras and one or more displays.

An example embodiment of the present disclosure relates to a system for capturing and presenting a view rearward and along a side of a vehicle (e.g., side view, driver side view, passenger side view) and/or a view rearward of the vehicle (e.g., rear-view, backup view). The system is adapted to provide the side view and/or the rear-view while the vehicle is moving or at a standstill. The side view and/or the rearview as captured and presented by the system aid are adapted to aid the driver while operating the vehicle.

An example embodiment of the system captures (e.g., detects) video data rearward and along the side of the vehicle (e.g., side view) and/or rearward (e.g., behind) of the vehicle (e.g., rear-view). The example embodiment presents the video data from rearward and along the side of a vehicle to present the side view of the vehicle. The sample embodiment presents the video data from rearward of the vehicle to present the rear-view. The example embodiment presents the video data on one or more displays. The example embodiment captures the video data using one or more cameras. The example embodiment captures the video data at one or more resolutions. The example embodiment captures the video data within a field-of-view of a camera. The resolution of the video data captured by the camera and/or the field-of-view of the camera may change in accordance with the operation of vehicle and/or a selection made by the driver. The video data may be presented at different resolutions on the same display. The video data may be presented at different resolutions on different displays. The video data may be presented on the entire display area of the display or only on a portion of the display area of the display. A portion of the display area of the display may be used present video data captured by the camera at the lower resolution. The entire display area of the display may be used present video data captured by the camera at the higher resolution.

An example embodiment of the system further includes a processing circuit and a memory. The processing circuit may detect operation of control 190, the direction in which the vehicle operates (e.g., forward gear, reverse gear), and/or whether a turn signal is active. The processing circuit may control, directly or indirectly, the resolution of a camera and/or a display, and/or the video data displayed on a display. The memory may store, inter alia, a program for execution by the processing circuit that when executed causes the processing circuit to perform the functions of the system.

Side View Cameras

In an example embodiment, the vehicle 100 includes the camera 110 and the camera 120. The vehicle 100 is designed for right-hand traffic (e.g., steering wheel on left, forward traffic on right). The camera 110 is adapted to be positioned on the driver's side of the vehicle 100. The camera 120 is adapted to be positioned on the passenger side of the vehicle 100. The camera 110 and the camera 120 are adapted to mounted (e.g., coupled, connected) to the vehicle 100. The camera 110 and the camera 120 may be adapted to connect directly to the body of the vehicle 100 or to an arm (e.g., post) that extends from the body of the vehicle 100.

In an embodiment where the camera 110 and the camera 120 are adapted to respectively connect to an arm, the arms may be extensible which means that the arms may extend or retract. As the arms extend (e.g., lengthen), the cameras 110 and 120 move further away from the body of the vehicle 100. As the arms retract (e.g., shorten), the cameras 110 and 120 move closer to the body of the vehicle 100.

The cameras 110 and 120 capture the video data in a respective field-of-view. Because the cameras 110 and 120 are adapted to capture video data rearward and along the side of the vehicle 100, the field-of-view of the cameras 110 and 120 are directed rearward from the point at which they are mounted to the vehicle 100 or to the arms 114 and 124 respectively. Further, the cameras 110 and 120 may capture the video data in one or more fields of view. The cameras 110 and 120 may capture the video data in a first field-of-view for a first period of time then switch to capture the video data in a second field-of-view for a second period of time. The field-of-view captured by the camera 110 may be independent of the field-of-view captured by the camera 120.

Figure 9:
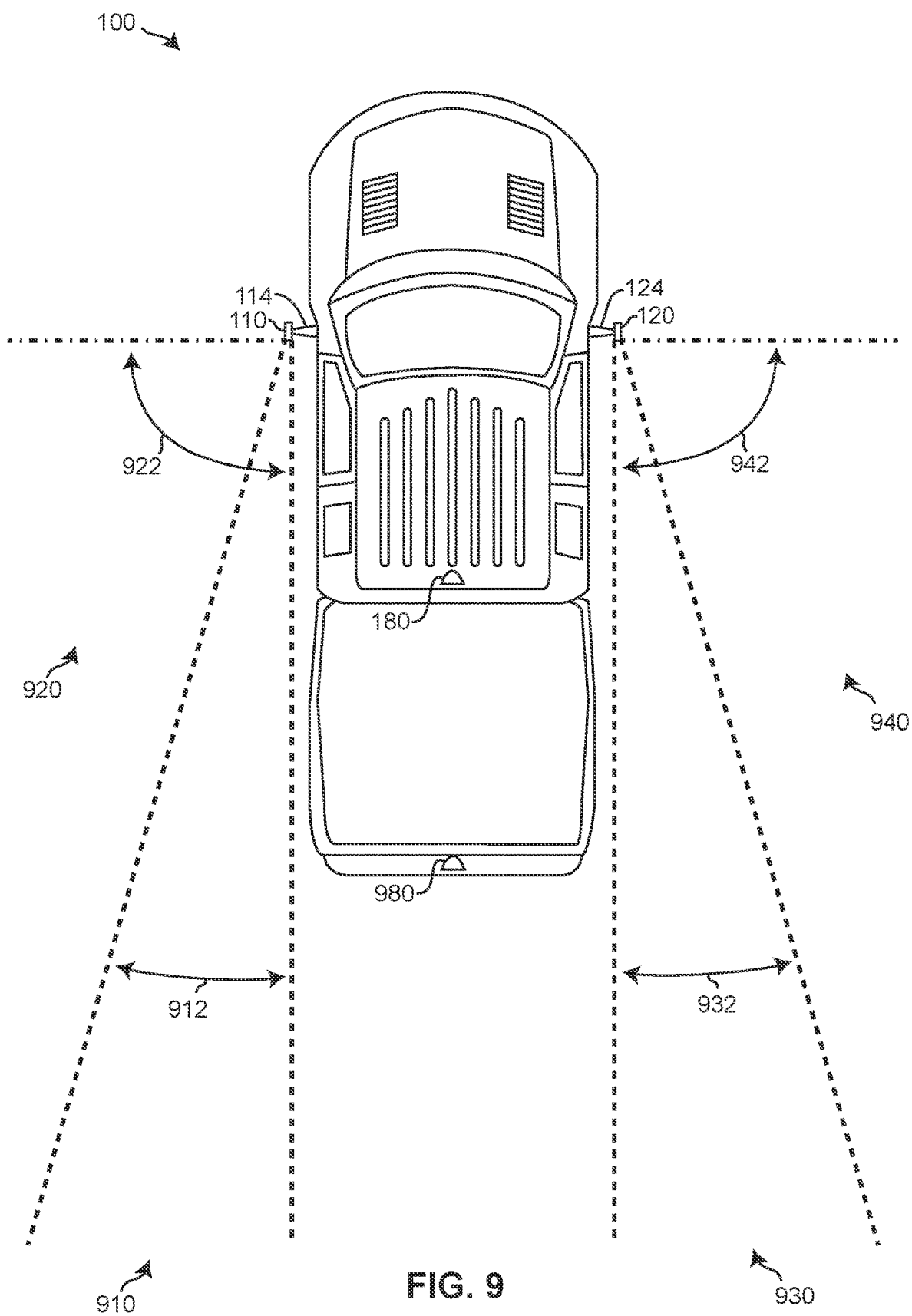
FIG. 9 is top view of the vehicle with an example embodiment of the system.
Figure 10:
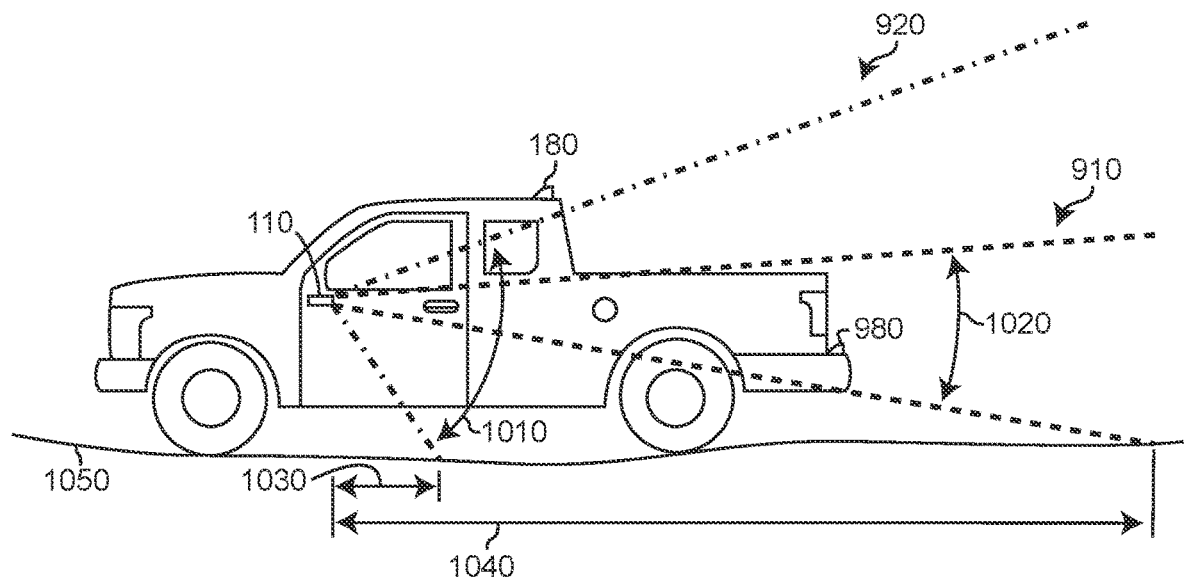
FIG. 10 is a left side view of the vehicle with an example embodiment of the system.
Figure 11:
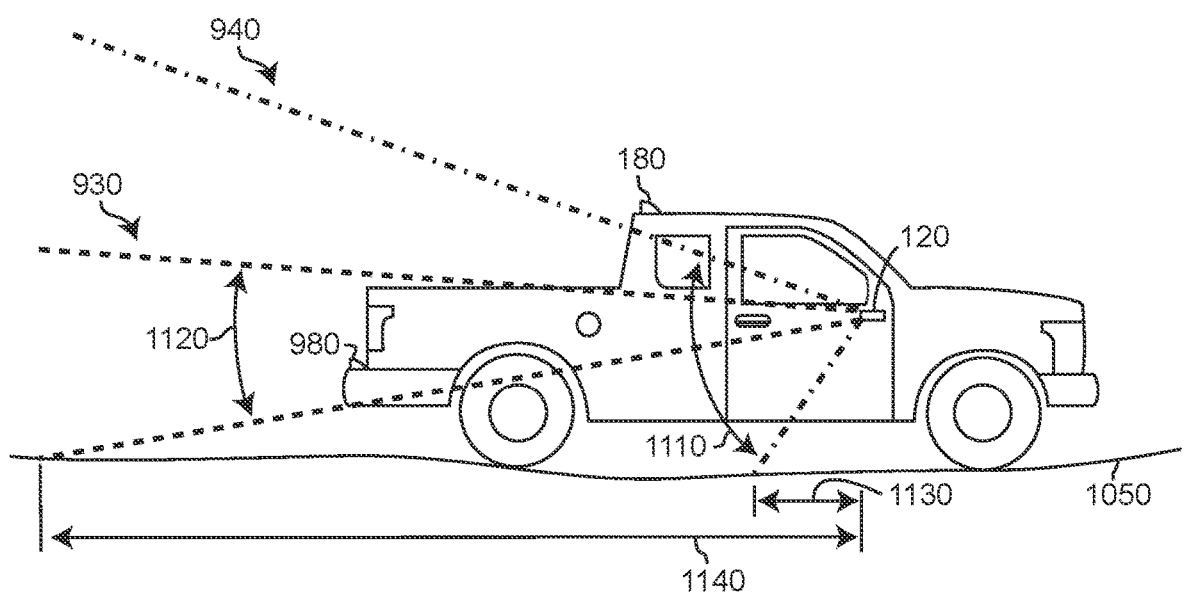
FIG. 11 is a right-side view of the vehicle with an example embodiment of the system.
Figure 12:
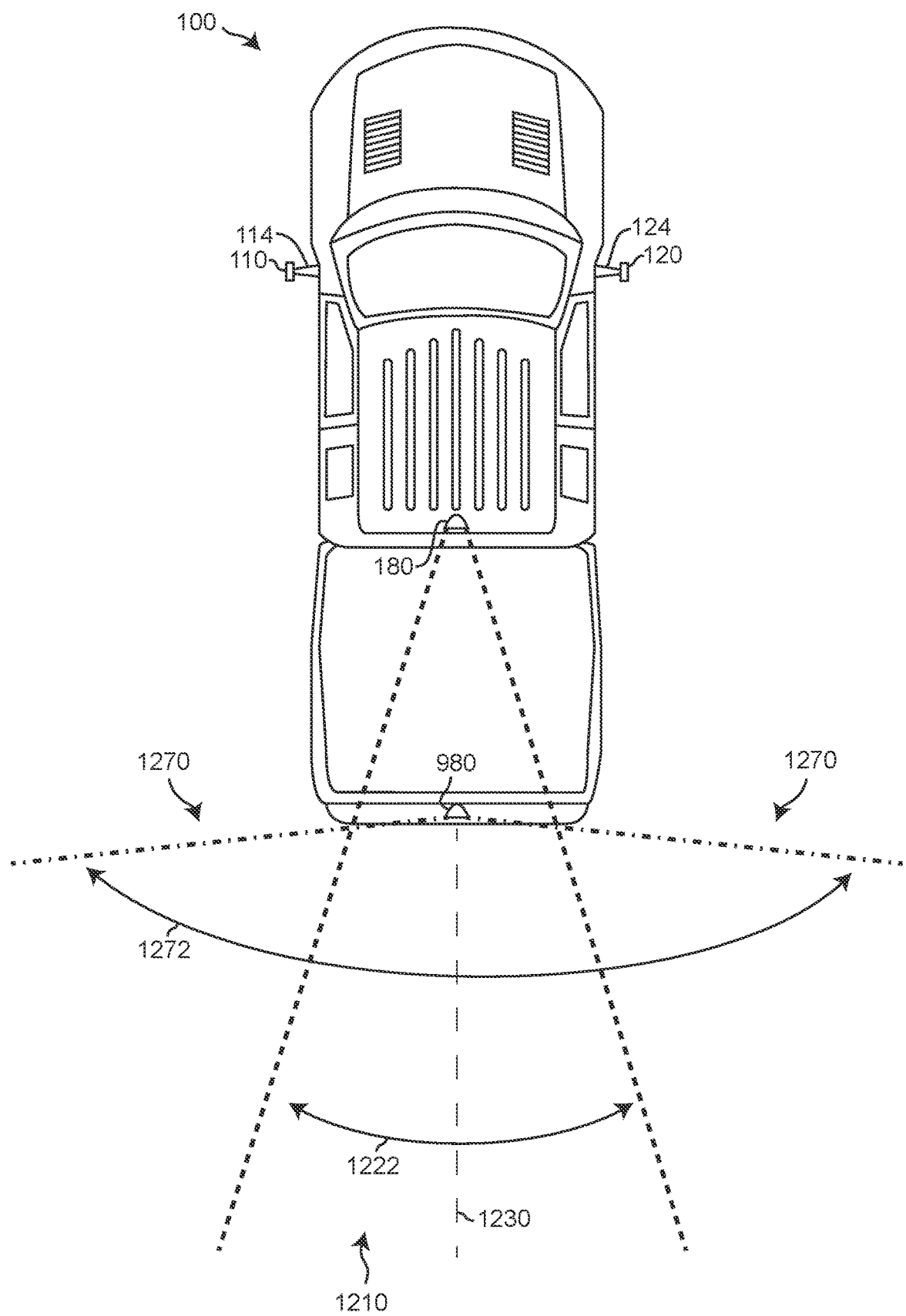
FIG. 12 is a top view of the vehicle with another example embodiment of the system.
Figure 13:
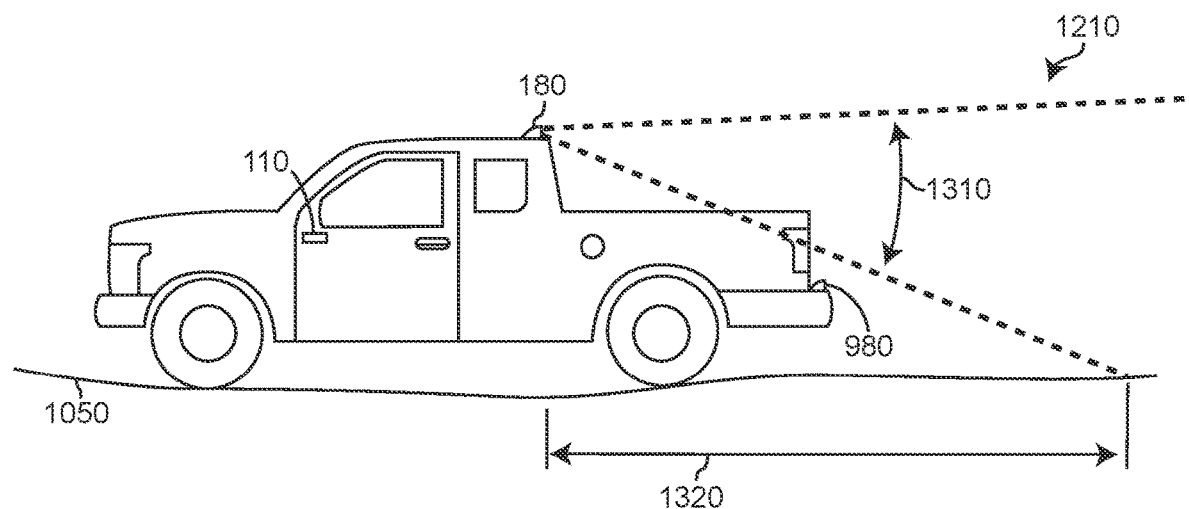
FIG. 13 a left side view of the vehicle with an example embodiment of the system.
Figure 14:
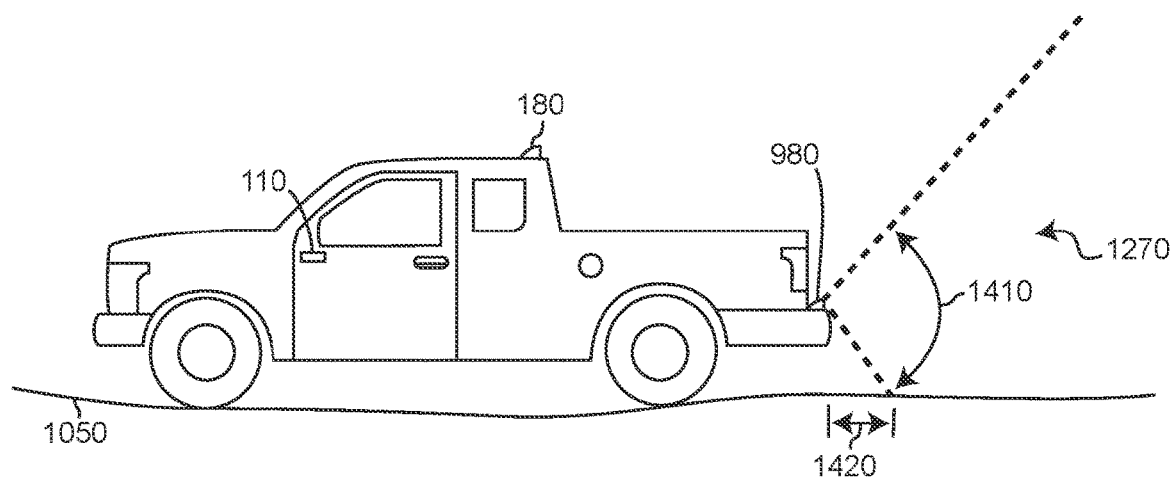
FIG. 14 a left side view of the vehicle with an example embodiment of the system.

For example, as best shown in FIGS. 9-11, the camera 110 is adapted to capture video in a narrow field-of-view 910 or a wide field-of-view 920. Similarly, the camera 120 is adapted to capture video in a narrow field-of-view 930 and a wide field-of-view 940. Because the field-of-view of the camera 110 is independent of the field-of-view of the camera 120, the camera 110 may capture video data in the narrow field-of-view 910 or the wide field-of-view 920 while the camera 120 captures video data in the narrow field-of-view 930 or the wide field-of-view 940.

A field-of-view of a camera includes a horizontal field-of-view and a vertical field-of-view. With respect to camera 110, the narrow field-of-view 910 includes the horizontal field-of-view covered by the angle 912 and the vertical field-of-view covered by angle 1020. The wide field-of-view 920 includes the horizontal field-of-view covered by angle 922 and the vertical field-of-view covered by angle 1010. With respect to camera 120, the narrow field-of-view 930 includes the horizontal field-of-view covered by the angle 932 and the vertical field-of-view covered by angle 1120. The wide field-of-view 940 includes the horizontal field-of-view covered by the angle 942 and the vertical field-of-view covered by angle 1110.

In an example embodiment, the angles 912 and 932 are in the range of 30-45 degrees. The angles 922 and 942 are in the range of 60-100 degrees. The angles 1020 and 1120 are in the range of 30-60 degrees, while the angle 1010 and 1110 are in the range of 70-120 degrees.

In an example embodiment, the cameras 110 and 120 are adapted to be oriented so that the ground 1050 is visible in the field-of-view 920 and 940 a first distance 1030 and 1130 respectively behind (e.g., rearward of) the camera 110 and 120. While the cameras 110 and 120 are so oriented, the ground 1050 is visible in the field-of-view 910 and 930 a second distance 1040 and 1140 respectively behind the cameras 110 and 120. The second distances 1040 and 1140 are greater than the first distances 1030 and 1130 respectively.

While the vehicle 100 is traveling forward (e.g., forward gear) and the driver wants to change lanes or turn (e.g., right, left), capturing and presenting video data in the wide field-of-view 920 or 940 provides the driver information regarding other vehicles or objects in the blind spot along the side of the vehicle 100, so the driver may avoid collision. While the driver is traveling backwards in the reverse direction (e.g., reverse gear), capturing and presenting video data in the wide field-of-view 920 and/or 940 provides the driver with information regarding the immediate surroundings of the vehicle 100 including the ground, so the driver can back up without running over or colliding with something. While the driver is driving in a forward direction and does not need to change lanes or turn, capturing and presenting video data in the narrow field-of-view 910 and/or 930 provides the driver with information regarding the other vehicles and objects further behind the vehicle 100, so the driver has a longer-range view of what might be approaching from behind.

As discussed above, the video data as captured in the narrow and/or wide fields-of-view is more useful in different circumstances. Accordingly, the system may detect the mode of operation of the vehicle 100 and automatically (e.g., without driver intervention) switch between the narrow field-of-view (e.g., 910, 930) and the wide field-of-view (e.g., 920, 940). In an example embodiment, during normal forward operation of the vehicle 100, cameras 110 and 120 are set to capture in the narrow fields-of-view 910 and 930. When the operator (e.g., driver) activates the turn signal (e.g., turn indicator) (e.g., 140, 150), the system changes from the narrow field-of-view (e.g., 920, 940), to the wide field-of-view (e.g., 920, 940) to provide the driver information regarding other vehicles or objects in its blind spots and in the direction of the turn.

For example, the driver operates turn signal control 230 to activate either the left turn signal 140 or the right turn signal 150. When the driver activates the left turn signal 140, the system detects the activation of the left turn signal 140. Responsive to detecting activation of the left turn signal 140, the system switches the camera 110 from capturing the video data in the narrow field-of-view 910 to capturing the video data in the wide field-of-view 920. When the driver activates the right turn signal 150, the system detects the activation of the right turn signal 150. Responsive to detecting activation of the right turn signal 150, the system switches the camera 120 from capturing the video data in the narrow field-of-view 930 to capturing the video data in the wide field-of-view 940. When the driver deactivates either the left turn signal 140 or the right turn signal 150, the system switches the camera 110 or the camera 120 respectively from capturing in the wide field-of-view 920 or 940 to capturing in the narrow field-of-view 910 or 930 respectively.

When the operator places the vehicle 100 in reverse to back up, the system sets the cameras 110 and 120 to capture in the wide field-of-view 920 and 940 respectively to provide the driver additional visual information regarding the immediate surroundings of the vehicle 100. When the vehicle is set to drive in the forward direction and the turn signals 140 and 150 are not active (e.g., activated, operational), the system sets the cameras 110 and 120 to capture in the narrow field-of-view to provide the driver with information regarding vehicles and/or objects further behind the vehicle 100. The operator may operate a gear control 240 to place the vehicle 100 in reverse, in forward (e.g., drive), in neutral, or other forward and/or reverse gears.

Extensible Arms

In an example embodiment, the cameras 110 and 120 are mounted directly to the body of the vehicle 100. While mounted to the body of the vehicle 100, the positions of the cameras 110 and 120 are fixed with respect to the vehicle 100 and do not change. In another example embodiment, cameras 110 and 120 are mounted on the arms 114 and 124 respectively. Arms 114 and 124 may be extensible. In other words, the arms 114 and 124 may extend or retract with respect to the body of the vehicle 100. As the arm (e.g., 114, 124), extends, the camera attached to the arm moves further away from the body of the vehicle 100. As the arm retracts, the camera attached to the arm moves closer to the body of the vehicle 100.

Extending the arms 114 and 124 may be useful when the vehicle 100 is towing a trailer. For example, assume that the camera 110 and 120 are attached to the body of the vehicle 100 on the driver side and the passenger side respectively. Regardless of whether the cameras capture data in the narrow or wide field-of-view, the trailer, and in particular a wide trailer, will block part of the rearward view of the cameras. In other words, the trailer will make a portion of the video data captured in the field-of-view less useful because it will be an unchanging view of the front of the trailer.

While the vehicle 100 is towing the trailer, the arms 114 and 124 may be extended so that the inside boundary (e.g., edge of the field-of-view closest to the vehicle) of the field-of-view moved away from the vehicle 100 to be positioned rearward and alongside of the trailer, as opposed to rearward and along the side of the vehicle. Extending the arms 114 and 124 enables the cameras 110 and 120 to capture video data along the side of the trailer, thereby providing the driver information as to the surroundings of the trailer. When the trailer is detached from the vehicle 100, the arms 114 and 124 may be retracted so that the field-of-view of the cameras 110 and 120 captures video data rearward and along the side of the vehicle 100 once more.

Figure 15:
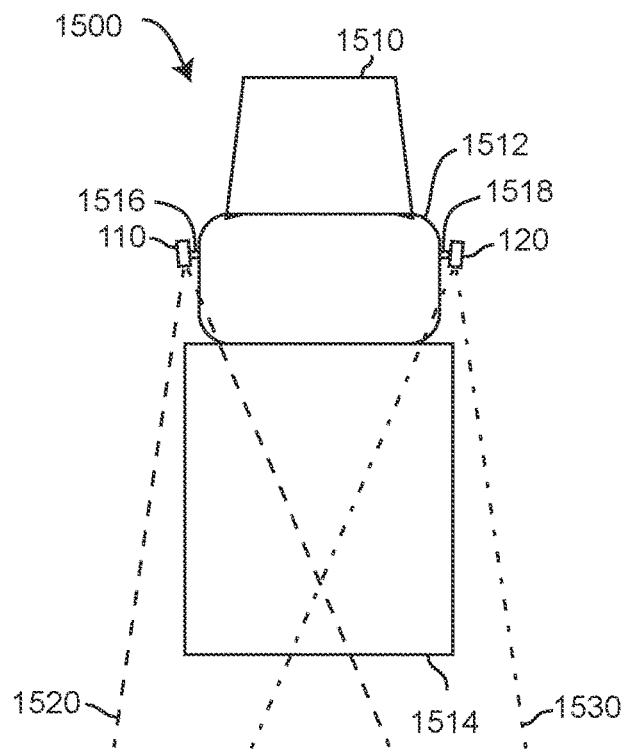
FIG. 15 is a top view of a second vehicle with cameras retracted.

In another example implementation, the camera 110 and the camera 120 are attached the arm 1516 and the arm 1518 respectively, which in turn are connected to vehicle 1500. Vehicle 1500 includes front 1510, body 1512 and bed 1514. The arms 1516 and 1518 are adapted to connect to the body 1512. While vehicle 1500 is not being operated (e.g., parked, not in gear, not in the drive mode), the arms 1516 and 1518 retract to stow (e.g., store, position) the cameras 110 and 120. Retracting the arms 1516 and 1518 brings the cameras 110 and 120 closer to the body 1512 of the vehicle 1500. While cameras 110 and 120 in the retracted position, they may be oriented to protect the cameras, for example as best seen in FIG. 15, which may not provide a desirable view rearward or along the side of the vehicle. For example, in FIG. 15, the cameras 110 and 120 are rotated respectively inward toward body 512 to protect them from damage. So, the field-of-view 1520 and the field-of-view 1530 are oriented more over the bed 1514 then rearward and to the side of vehicle 1500. However, since the vehicle is not being operated, such information may not be needed.

While the vehicle 1500 is being operated (e.g., in the drive mode), the cameras 110 and 120 are taken out of the stowed mode and the arms 1516 and 1518 extend to position the cameras 110 and 120 for capturing and providing video data rearward and along the sides of the vehicle 1500. While the arms 1516 and 1518 are extended, the cameras 110 and 120 are in position for capturing video data to show on one or more displays for the driver to use while operating the vehicle 1500. Exiting the stowed mode and the extension of the arms 1516 and 1518 may occur automatically upon the driver entering the vehicle and or preparing the vehicle to be driven (e.g., starting the vehicle, placing in gear).

As shown in FIGS. 15-18, the cameras 110 and 120 may be retracted or extended using the arms 1516 and 1518. The camera 110 attaches to the arm 1516 and captures video data in the field-of-view 1520. The camera 120 attaches to the arm 1518 and captures video data in the field-of-view 1530. While vehicle 1500 is not being operated, referring to FIGS. 15 and 17, the arms 1516 and 1518 are retracted to position the cameras 110 and 120 proximate to the body 1512 and in the stowed position.

Figure 16:
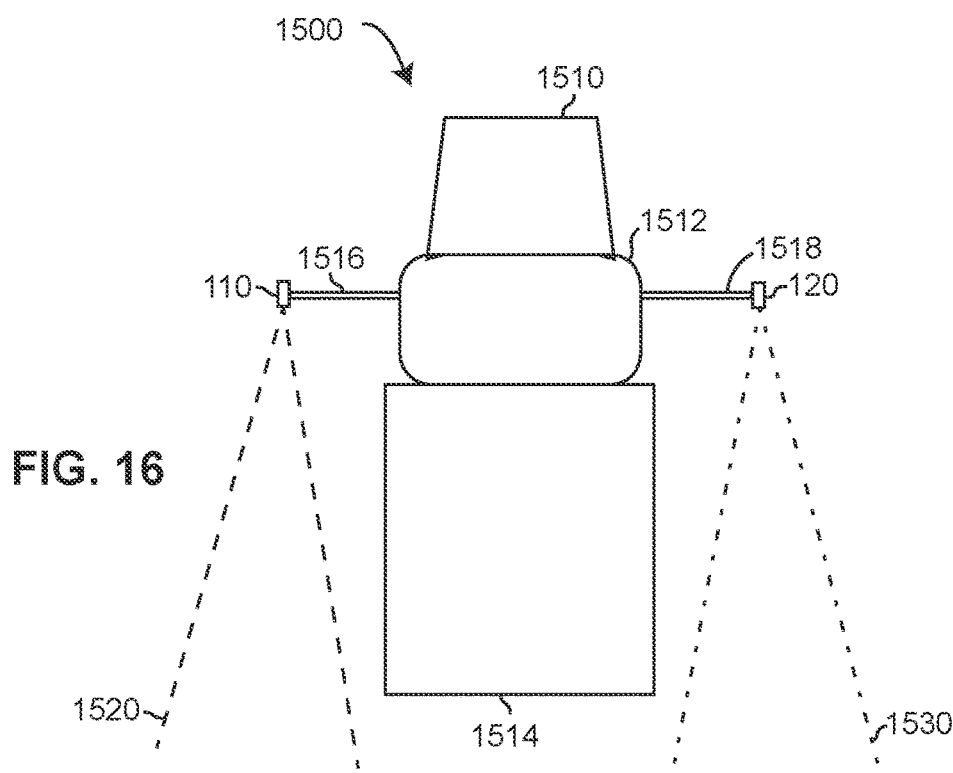
FIG. 16 is a top view of the second vehicle with the cameras extended.
Figure 17:
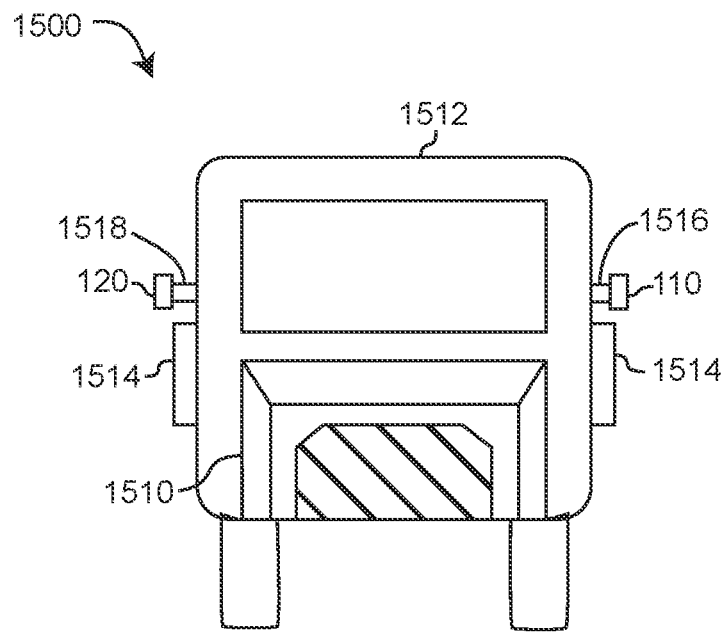
FIG. 17 is a front view of the second vehicle with the cameras retracted.
Figure 18:
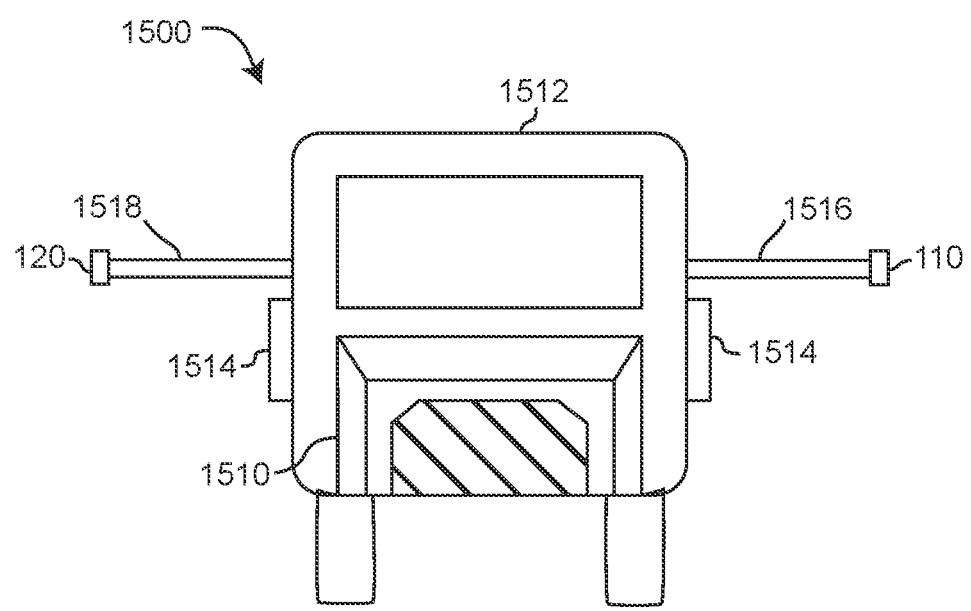
FIG. 18 is a front view of the second vehicle with the cameras extended.

While vehicle 1500 is being operated, referring to FIGS. 16 and 18, the arms 1516 and 1518 are extended to position the cameras 110 and 120 away from (e.g., distal from) the body 1512 of vehicle 1500. Positioning cameras 110 and 120 away from vehicle 1500, positions the field-of-view 1520 and 1530 to provide video data rearward and along the sides of the vehicle 1500. While the arms 1516 and 1518 are extended, the video data captured along the sides of the vehicle 100 in the field-of-view 1520 and 1530 provides information regarding objects that may be positioned alongside and/or rearward of the vehicle 1500.

The cameras 110 and 120 and/or the arms 1516 and 1518 may be shaped so that air movement (e.g., flow) does not interfere with and/or affect the positioning of the cameras while the arms 1516 and 1518 are extended.

An arm (e.g., 114, 124, 1516, 1518) may be articulated. An arm may include one or more joints. A joint may permit the arm and or a portion of the arm to turn in one or more directions. A joint may enable the arm to be positioned with respect to the vehicle. A joint may enable a camera (e.g., 110, 120) to be positioned with respect to the arm. A joint may enable rotation (e.g., turning) of the arm and/or the camera in any direction.

Figure 19:
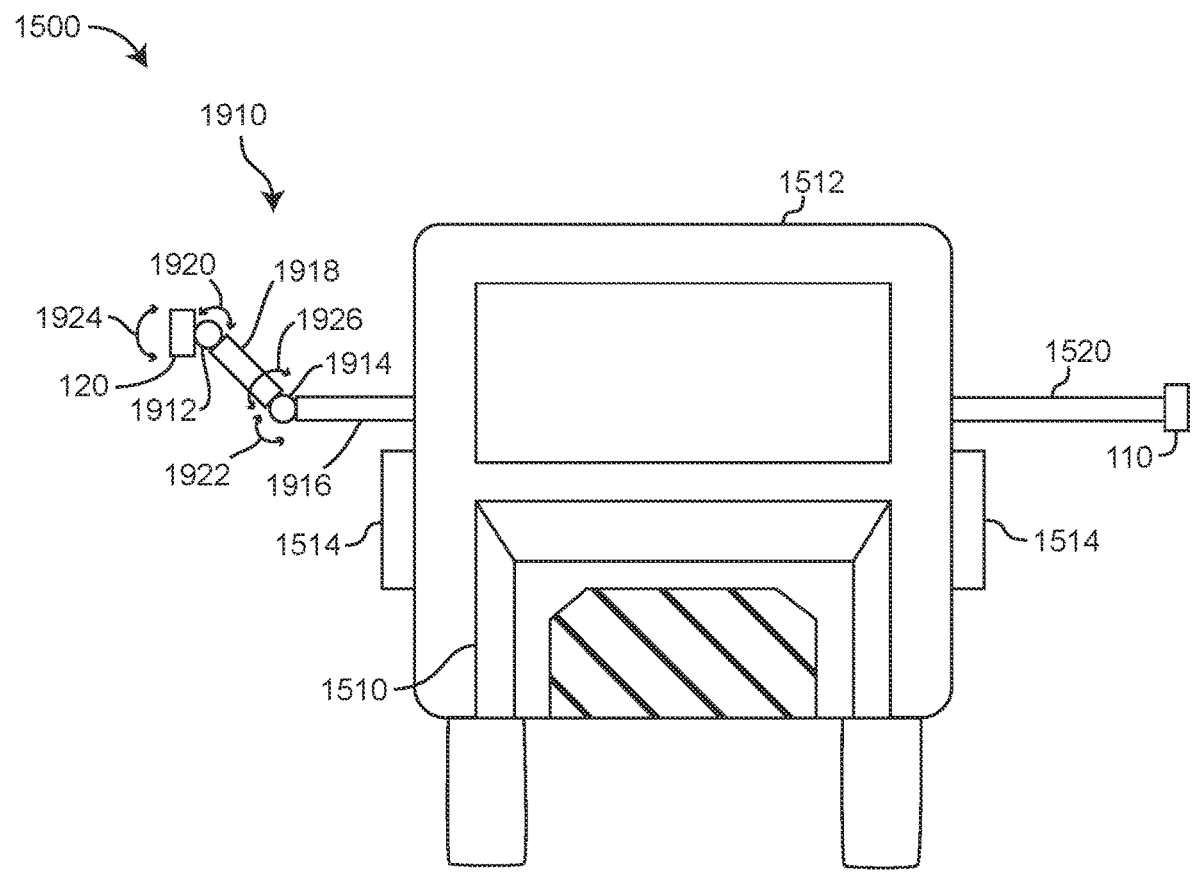
FIG. 19 is a front view of the second vehicle with another example embodiment of an arm.
Figure 20:
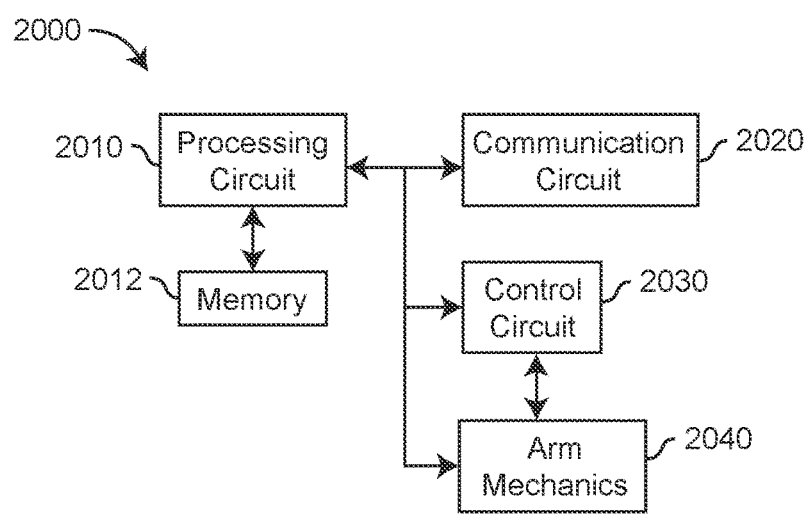
FIG. 20 is a diagram of an example embodiment of a camera control circuit.

For example, the arm 1910, shown in FIG. 19, includes the arm segment 1916, the arm segment 1918, the joint 1912 and the joint 1914. The camera 120 is adapted to connect to the arm 1910. The arm 1910 may retract and extend similarly to the arms 1516 and 1518. The joint 1914 may rotate in the direction 1922 (e.g., in the plane of the page) and the direction 1926 (e.g., into and out of the plane of the page). The joint 1914 enables the arm segment 1918 to rotate with respect to the arm segment 1916. The joint 1912 may rotate in the direction 1920 (e.g., in the plane of the page) and the direction 1924 (e.g., into and out of the plane of the page). The joint 1912 enables the camera 110 to rotate with respect to the arm segment 1918. In an implementation, the joint 1914 and/or the joint 1912 enable near 360° rotation in any direction.

In an example embodiment, the arm segment 1916 may extend and/or retract independently of the arm segment 1918. The arm segment 1918 may extend or retract between the joint 1914 and the joint 1912. In another example embodiment, the majority, if not all, of the arm 1910 may retract into vehicle 1500. The arm segment 1916 may need to be aligned with the arm segment 1918 prior to extending or retracting. A further joint (not shown) may be used to attach the arm segment 1916 to vehicle 1500 so that the arm segment 1916 may rotate with respect to the body 1512.

The joint 1912 and/or 1914 may rotate to position the field-of-view 1530. Camera 120 may be rotated to capture data along the side of vehicle 1500 with less extension of the arm segments 1916 and 1918 than may be required of the arms 1516 and 1518 or the arms 114 and 124. Further, the joint 1914 may rotate to position the camera 120 above or below the bed 1514. The camera 120 may be positioned above the bed 1514 so that the field-of-view 1530 is positioned above and/or over an object positioned in the bed 1514 to facilitate capturing video data rearward of the vehicle 1500. The camera 120 may be positioned below the bed 1514.

Control Circuit

The vehicle 100 and/or the vehicle 1500 may include electronic and/or mechanical devices for controlling the positioning and/or orientation of the cameras 110 and 120. For example, the vehicles 100 and/or 1500 may include a camera control circuit 2000. The camera control circuit 2000 may include processing circuit 2010, memory 2012, communication circuit 2020, control circuit 2030, and arm mechanics 2040. The camera control circuit 2000 may control the extension and/or retraction of the arms 114, 124, 1516, 1518 and/or 1910. The camera control circuit 2000 may control the rotation of joints 1912 and 1914. The camera control circuit 2000 may control the rotation of the joints 1912 and 1914 to position the camera 120.

The camera control circuit 2000 and/or the arms 114, 124, 1516, 1518 and/or 1910 may include microprocessors, semiconductor memory, wireless transceivers, microcontrollers, linear actuators, linear controllers, rotary actuators, pneumatic pistons, hydraulic pistons, hydraulic pumps, rotary motors, stepper motors, and/or sensors.

The camera control circuit 2000 may detect when the vehicle 100 and/or 1500 is in operation or when it is not in operation. Detecting when the vehicle 100 and/or 1500 is in operation may include detecting when the transmission of the vehicle 100 and/or 1500 is placed in gear (e.g., not in the park position). Detecting operation of the vehicle 100 and/or 1500 may further include detecting movement of the vehicle. The camera control circuit 2000 may detect when the vehicle 100 and/or 1500 is placed in an operating state by a driver. Upon detecting that the vehicle is in the operating state, the camera control circuit 2000 may automatically, without user intervention, move the cameras and/or the arms from the stowed position to an extended position. The camera control circuit 2000 may automatically rotate the joints 1912 and 1914 to position the camera 120.

The camera control circuit 2000 may use a variety of techniques to determine where to position the camera 110 and/or the camera 120. For example, a user may use a manual control (e.g., button, joy-stick) to position the camera 110 and 120 to capture the video data needed by the driver to operate the vehicle. Once the cameras 110 and 120 have been adequately positioned by the user, the user may inform camera control circuit 2000, for example by pressing a button, that the cameras have been positioned. The processing circuit 2010 may detect metrics (e.g., measurements, positions, angles) from the arm mechanics 2040 and/or from the control circuit 2030 and stores the metrics in the memory 2012. When the vehicle 100 and/or 1500 is placed in an operational mode, the processing circuit 2010 retrieves the position metrics from the memory 2012 and provides the metrics to the control circuit 2030. The control circuit 2030 uses the metrics to control the arm mechanics 2040 to position the cameras 110 and 120 to the position previously set by the user.

In another implementation, camera control circuit 2000 may use stored information and/or information received via communication circuit 2020 to position the cameras 110 and/or 120 without user intervention. For example, images of the sides of the vehicle 100 and/or 1500 may be stored in the memory 2012 and/or received via the communication circuit 2020. When the vehicle 100 and/or 1500 is placed in an operating mode, the processing circuit 2010 may instruct the control circuit 2030 and/or the arm mechanics 2040 to extend and/or rotate the arms 114, 124, 1516, 1518 and/or 1910 until the images of the sides of the vehicle 100 and/or 1500 captured by camera 110 and/or camera 120 match the images stored in the memory 2012 or received via the communication circuit 2020. Comparing live captured data from the cameras 10 and/or 120 to stored or received data enables the camera control circuit 2000 to position the cameras 110 and/or 120 to a particular position without user intervention.

In another implementation, the processing circuit 2010 may analyze data captured by the camera 110 and/or the camera 120 to determine whether a minimum distance from the side of the vehicle 100 and/or 1500 lies in the field-of-view (e.g., 910, 930, 1520, 1530) of the cameras 110 and/or 120. The camera control circuit 2000 may extend the arms 114, 124, 1516 and/or 1518 or extend and rotate the arm 1910 until cameras 110 and 120 capture images that are a minimum distance away from the sides of the vehicle 100 and/or 1500, so as to reduce potential blind spots.

In the event that a trailer is attached to the rear of the vehicle 100 and/or 1500, the camera control circuit 2000 may extend and/or rotate the arms 114, 124, 1516, 1518 and/or 1910 until the field-of-view of the cameras 110 and/or 120 captures video data rearward and along the side of the attached trailer. The vehicle 100 and/or 1500 may detect the presence of a trailer attached to vehicle and may inform camera control circuit 2000 that it must position the cameras 110 and 120 to capture video data along the sides of both vehicle and the trailer. The vehicle 100 and/or 1500 may detect the presence of a trailer by detecting additional weight attached to the vehicle 100, visually detecting the trailer using the cameras 110 and 120, and/or by detecting the coupling of the trailer's electrical system to the electrical system of the vehicle 100 and/or 1500.

In the event, that a load is positioned in the bed 1514 that extends beyond bed 1514 on one or both sides of the vehicle 100 and/or 1500, the camera control circuit 2000 may adjust the position and/or orientation one or both cameras 110 and/or 120 to provide video data a distance away from the object carried by the vehicle 100 and/or 1500. For example, if an object extends 2 feet on each side of the bed 1514, the camera control circuit 2000 may position the cameras 110 and 120 and/or extend the arms 114, 124, 1516, 1518 and/or 1910 until the field-of-view (e.g., 910, 930, 1520, 1530) captures video data a distance to each side of the object that extends from the bed 1514.

The vehicle 100 and/or 1500 may detect the presence of a load in the bed 1514 by detecting an increase of the weight of the load on the vehicle and/or comparing images of the bed without a load to a present image of the bed.

The camera control circuit 2000 may further determine whether the video data collected behind the vehicle 100 and/or 1500 is sufficient. The camera control circuit 2000 may use images captured by the cameras 110 and 120 to determine whether the field-of-view (e.g., 910, 930, 1520, 1530) captures video data behind the vehicle 100 and/or 1500. In the event that field-of-view provides little or no video data regarding what is behind the vehicle 100 and/or 1500, the camera control circuit 2000 may attempt to reposition the cameras 110 and 120 to position the field-of-view to capture more video data rearward of the vehicle 100 and/or 1500.

For example, if video data captured behind the vehicle 100 and/or 1500 is insufficient, the camera control circuit 2000 may further extend the arms 114, 124, 1516, 1518 and/or 1910 and/or rotate the joints of the arm 1910 to increase the video data captured by the cameras 110 and 120 rearward of the vehicle 100 and/or 1500.

Rearward facing cameras (e.g., 180, 980) may also be controlled by the camera control circuit 2000. The camera control circuit 2000 may further control the resolution and/or frame rate of the video data captured by the cameras 110 and 120.

Rear-View Cameras

In an example embodiment, the vehicle 100 includes the camera 180 and the camera 980. The cameras 180 and 980 adapted to be positioned on the vehicle and oriented to capture video data rearward of the vehicle. In an example embodiment, the camera 180 is adapted to be positioned on the vehicle at a location that is higher than the camera 980. For example, the camera 180 is positioned on top of the roof of the vehicle 100, while the camera 980 is positioned on the rear bumper of the vehicle 100. The cameras 180 and 980 are adapted to connect directly to the body or a portion (e.g., bumper, license plate holder, rear handle) of the vehicle 100.

As with the cameras 110 and 120, the cameras 180 and 980 are adapted to capture video data in a respective field-of-view independent of each other. Because the cameras 180 and 980 are adapted to capture video data rearward (e.g., behind) of the vehicle 100, the field-of-view of the cameras 180 and 980 are directed (e.g., oriented) rearward of the vehicle 100. For example, the field-of-view 1220 of the camera 180 and the field-of-view 1270 of the camera 980 are positioned and oriented to point rearward of the vehicle 100. The camera 180 captures video data within the field-of-view 1210. The camera 980 captures video data in the field-of-view 1270. In an embodiment, the camera 180 captures data within the field-of-view 1210 only and the camera 980 captures video data in the field-of-view 1270 only. In another example embodiment, the camera 180 and/or the camera 980 captures video data in (e.g., within) a narrow field-of-view 1210 or a wide field-of-view 1270.

The field-of-view 1210 includes a horizontal field-of-view and a vertical field-of-view. The field-of-view 1210 includes the horizontal field-of-view covered by the angle 1222 and the vertical field-of-view covered by angle 1310. The field-of-view 1270 includes the horizontal field-of-view covered by the angle 1272 and the vertical field-of-view covered by angle 1410. The center of the fields-of-view 1210 and 1270 may aligned with the central axis 1230 of the vehicle 100.

In an example embodiment, the angle 1222 is in the range of 45-90 degrees. The angle 1272 is in the range of 90-180 degrees. The angle 1310 is in the range of 30-70 degrees. The angle 1410 is in the range 90-120 degrees.

In an example embodiment, the camera 980 is adapted to be oriented so that the ground 1050 is visible in the field-of-view 1270 a first distance 1420 behind (e.g., rearward of) the camera 980. The camera 180 is oriented so that the ground 1050 is visible in the field-of-view 1210 at a second distance 1320 behind the camera 180. The second distance 1320 is greater than the first distance 1420 because the field-of-view 1210 is more narrow then whereas the field-of-view 1270

Whether the camera 180 and/or the camera 980 captures video data within the narrow field-of-view 1210 or the wide field-of-view 1270 may depend on the operation of the vehicle 100. For example, while the vehicle 100 is driving in the forward direction, the camera 180 and/or the camera 980 may capture the video data within the narrow field-of-view 1210 to provide a view that is a more distant from the vehicle 100 and does not show the ground close to the vehicle 100. The narrow field-of-view 1210 provides information regarding other vehicles and/or objects behind the vehicle 100. The video data captured in the narrow field-of-view 1210 provides the driver with information as to the vehicles that are approaching from behind. While the vehicle 100 is backing up in the reverse direction, the camera 180 and/or the camera 980 may capture the video data within the wider field-of-view 1270. The wider field-of-view 1270 provides the driver more information as to what is closely behind and/or around the vehicle 100, including the ground 1050 directly behind the vehicle 100, so the driver can avoid a collision or driving over something.

When the driver places the vehicle in a forward gear for forward movement, the camera 180 and/or the camera 980 may automatically (e.g., without driver intervention) switch to the narrow field-of-view 1210. When the driver places the vehicle in a reverse gear for backing up, the camera 180 and/or the camera 980 may automatically switch to the wide field-of-view 1270. It is also possible that when the driver activates a turn signal (e.g., 140, 150), that the camera 180 and/or the camera 980 automatically switch to the wide field-of-view 1270 to capture video data in the rear/sides blind spots of the vehicle to provide the driver information regarding whether it is safe to change lanes.

In an example embodiment, the camera 180 is omitted and all the functions of rear-view cameras discussed above are performed by the camera 980 alone. In another embodiment, the camera 980 is omitted and all the functions of the rear-view cameras discussed above are performed by the camera 180 alone. In another example embodiment, the camera 980 operates only as a backup camera that captures video data while the vehicle 100 is in a reverse gear, while the camera 180 captures the video data while the vehicle is in a forward gear or the turn signal (e.g., 140, 150) is activated.

In an example embodiment, the driver of the vehicle 100 may operate the control 190 (e.g., button, switch, soft button on a touch-screen display) to switch the field-of-view of a rear-view camera (e.g., 180, 980) and/or a side view camera (e.g., 110, 120) from the narrow field-of-view (e.g., 910, 930, 1210) to the wide field-of-view (e.g., 920, 940, 1270) regardless of the operating state of the vehicle 100, the gear (e.g., forward, reverse) that is active, and/or the state (e.g., active, inactive, enabled, disabled) of the turn signal (e.g., 140, 150).

Camera Resolution

The cameras (e.g., 110, 120, 180, 980) of the vehicle 100 may capture video data at one or more resolutions. Resolution refers to the number of pixels captured in each image (e.g., frame) of the video data. Resolution may be described as the number of pixels across the width of an image and along the height of the image. Resolution may be described as a total number of pixels, which is the product of the number of pixels across the width and the number of pixels along the height. The cameras of the system may capture video data at any suitable resolution. A suitable resolution may include any standard resolution available on conventional video cameras. The cameras of the system may capture video data in any suitable format (e.g., MP4, MOV, WMV, FLV, AVI, AVCHD).

In an example embodiment, the cameras (e.g., 110, 120, 180, 980) of the system may capture the images of the video data at resolutions (W×H) that include 360 pixels×240 pixels, 480 pixels×272 pixels, 640 pixels×480 pixels, 720 pixels×576 pixels, 800 pixels×480 pixels, 1280 pixels×720 pixels, and/or 1366 pixels×768 pixels.

A video camera of the system may be switched from capturing the video data at one resolution to capturing the video data at another resolution. A video camera may be switched from one resolution to another resolution automatically in accordance with the operation of the vehicle 100. As discussed above with respect to switching from one field-of-view to another field-of-view, a camera of the system may be switched from capturing data at a first resolution to capturing data at a second resolution in accordance with the operating state of the vehicle 100, the gear (e.g., forward, reverse) that is active, the state (e.g., active, inactive, enabled, disabled) of the turn signal (e.g., 140, 150) and/or whether the driver has operated control 190.

A video camera (e.g., 110, 120, 180, 980) the system may switch from capturing video data at a lower resolution to capturing video data at a higher resolution, or vice a versa. A video camera of the system may switch both the resolution of video data capture and its field-of-view at the same time. In an example embodiment, the camera 110 captures video data within the narrow field-of-view 910 and that a lower resolution (e.g., 480 pixels×272 pixels) while the vehicle 100 moves in the forward direction, the turn signal (e.g., 140, 150) is inactive and the user has not activated (e.g., operated) the control 190. When the driver activates the turn signal control 230 to activate the left turn signal 140, the camera 110 automatically switches to the wide field-of-view 920 to capture video data. Further, the camera 110 also automatically switches from capturing video data at the lower resolution to capture video data at a higher resolution (e.g., 800 pixels×480 pixels). So, upon activation of the left turn signal 140, the camera 110 switches to capture the video data in the wider field-of-view 920 and at the higher resolution.

In another example, when the driver operates the gear control 240 to place the vehicle 100 in reverse for backing up, the camera 980 automatically switches from the narrow field-of-view 1210 to the wider field-of-view 1270 and switches from capturing the video data at a lower resolution to capturing the video data at a higher resolution. In another example embodiment, when the user places the vehicle 100 in reverse for backing up, the camera 180 ceases to capture data in the narrow field-of-view 1210 and at a lower resolution, and the camera 980 begins to capture data in the wider field-of-view 1270 at a higher resolution. In another example embodiment, when the user activates control 190, the camera 180 switches from capturing the video data in the narrow field-of-view 1210 at a lower resolution to capturing the video data in the wider field-of-view 1270 at a higher resolution.

Video data captured at a higher resolution provides an image on a display that has greater detail and more clarity. Capturing video data at a lower resolution may provide an image on a display that has less detail and less clarity, however the rate of capture (e.g., frame rate) may be higher and fewer processing (e.g., processing circuit, memory) resources may be used for the capture and display of the video data.

Displays

Video data captured by a camera may be presented to the driver on a display. A display includes a display area (e.g., screen) in which the video images are presented (e.g., shown) and are visible to the driver. The display area of the display is generally described as an area having a width and a height. Generally, the display area of the display area is measured in units of pixels. For example, the display area of a display may be 480 pixels wide and 272 pixels high. The number of pixels shown in the display area is referred to as the resolution of the display or the resolution of the image being presented. Accordingly, a display whose display area presents video data as 400 pixels across (e.g., width) and 272 pixels down (e.g., height) is described as having a 400×272 resolution. The resolution may also be described as the product of the pixels across and the pixels down as discussed above, so the resolution of this example display could also be described as being 108.8 K pixels.

A display may show video data in its display area at one or more resolutions. For example, a display may have a maximum resolution of 800 pixels×480 pixels, yet be able to present video data at the resolution of 400 pixels×272 pixels. In another example, a display may show video at 360 pixels×240 pixels, 480 pixels×272 pixels, 640 pixels×480 pixels, 720 pixels×576 pixels and 800 pixels×480 pixels. A display may accommodate different resolutions by presenting the video data on all of the display area or only a portion of the display area.

As discussed above, a video camera (e.g., 110, 120, 180, 980) may provide video data at different resolutions. As further discussed above, a video camera (e.g., 110, 120, 180, 980) may automatically switch between one resolution another resolution. A display may accommodate the change in resolution of the video data from the camera by presenting the video data at the different (e.g., new) resolution. Just as a camera may switch between different resolutions, a display may switch between different resolutions for presenting the video data from a camera. The display may detect a change in resolution of the video data from the camera and switch automatically to present the video data at the different resolution. A display may switch automatically in accordance with the operation of the vehicle (e.g., turn signal, forward gear, reverse gear, control 190 activated), as discussed above with respect to cameras.

A display and its corresponding display area may be any size. For example, common display areas are 3 inches×4 inches, 3 inches×5 inches, 4 inches×6 inches and 10 inches× 13 inches. The housing of the display that holds the display area may be slightly larger than the display area or the display may be a rimless display. A display may use any technology to present the video data. For example, a display may include TFT-LCD, IPS-LCD, touch screen LCD, OLED and AMOLED technology.

A display may be adapted to be positioned (e.g., mounted, coupled) at any location in a vehicle. A display may be mounted to the vehicle using any conventional mounts. A display may be adapted to be oriented for viewing by the driver of the vehicle. In an example embodiment, the vehicle 100 includes the camera 110 on the driver's side, the camera 120 on the passenger's side, and camera 180 or 980, which are oriented rearward with respect to the vehicle. The video data captured by the camera 120 is presented on display 122. The video data captured by the camera 110 is presented on display 112. The video data captured by camera 180 or 980 is presented on display 130.

Figure 2:
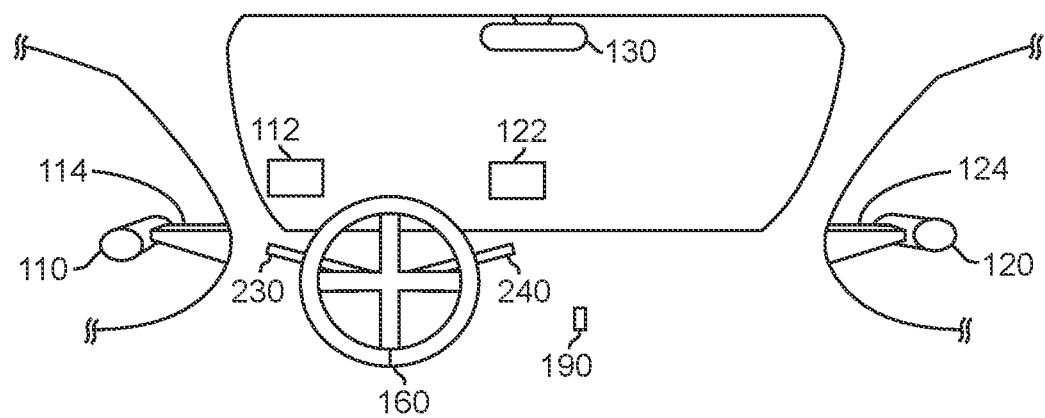
FIG. 2 is a diagram of the example embodiment of the system as seen from an interior of the vehicle.
Figure 3:
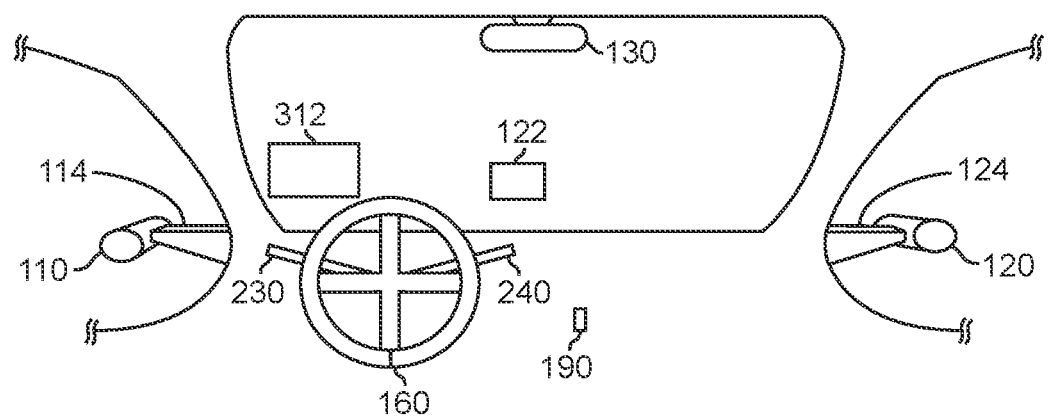
FIG. 3 is a diagram of another example embodiment of the system as seen from the interior of the vehicle.
Figure 4:
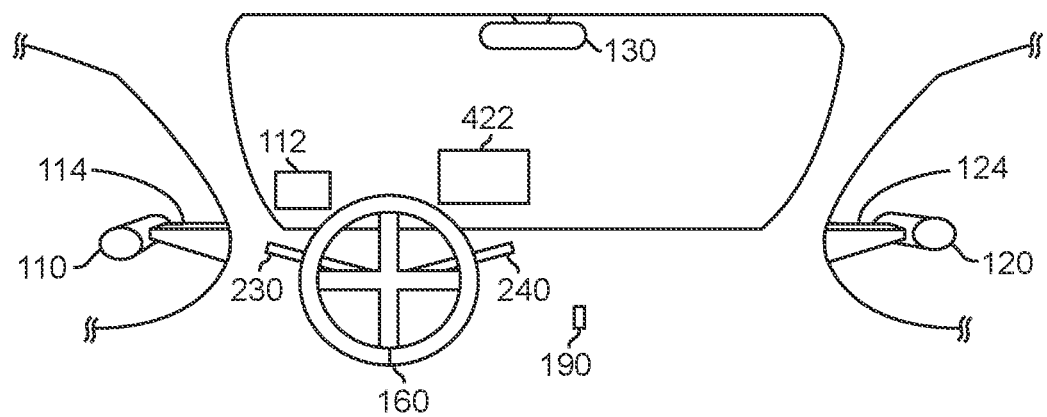
FIG. 4 is a diagram of another example embodiment of the system as seen from the interior of the vehicle.
Figure 5:
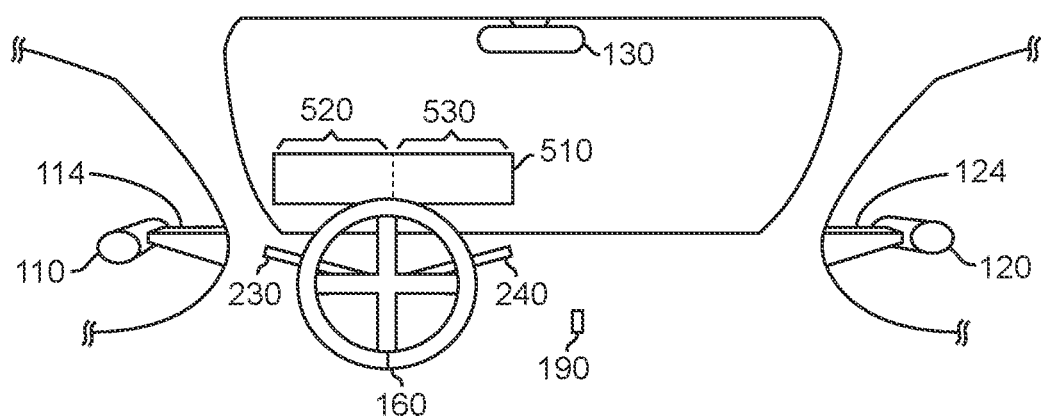
FIGS. 5-8 are diagrams of another example embodiment of the system as seen from the interior of the vehicle.
Figure 6:
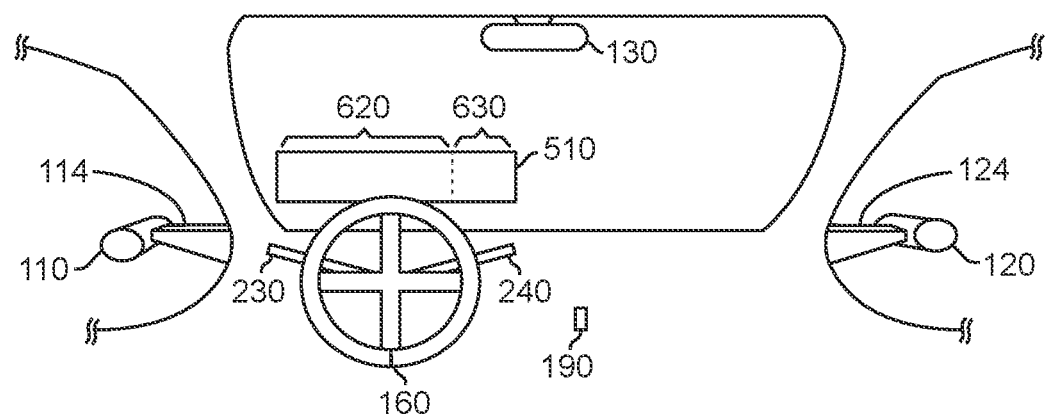
Figure 7:
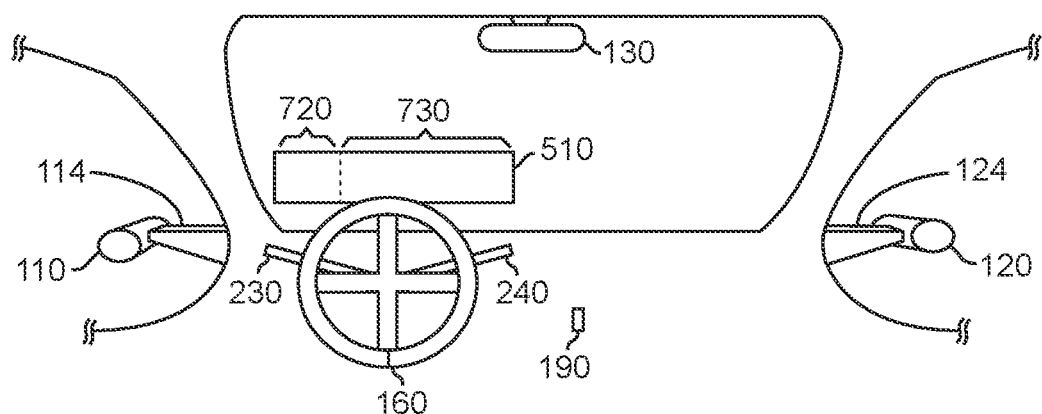
Figure 8:
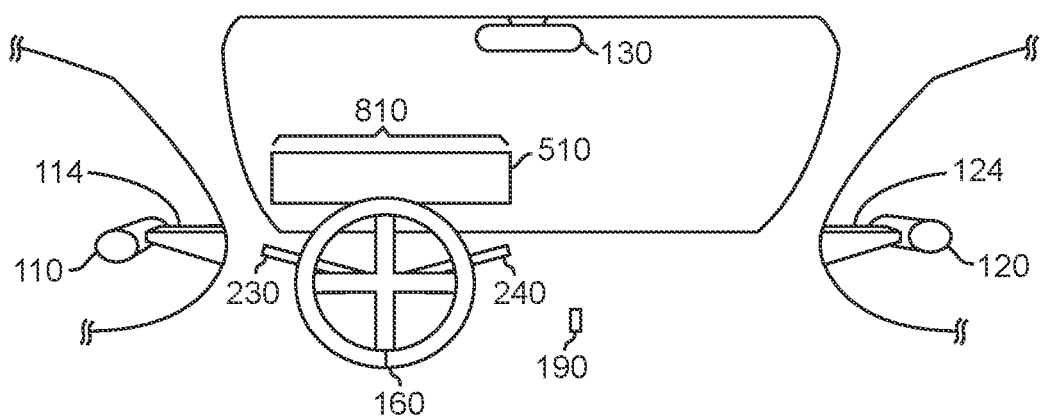

From the perspective of the driver, as best shown in FIGS. 2-4, display 112 is mounted to the left of steering wheel 160 and positioned toward the driver. If the vehicle 100 had side view mirrors, the driver would look to the left to see through the side view mirror on the driver's side. So, positioning display 112 to the left of the steering wheel puts it in a position to which the driver is accustom to look to see through the driver-side mirror. The display 122 is positioned to the right of steering wheel 160. Again, mounting display 122 to the right of the steering wheel places it in a position to which the driver is accustom to look to see through the passenger side mirror. The display 130 is mounted in the position where a rear-view mirror is normally located, so it to is located at a position that is familiar to the driver.

In another example embodiment, the display 112 and/or the display 122 are replaced with the display 312 and/or the display 422 respectively. The displays 312 and 422 is similarly positioned as the displays 112 and 122 respectively. The displays 312 and 422 are larger than the displays 112 and 122 respectively and provides larger display areas. The displays 312 and 422 may present the video data at multiple resolutions, just as with the display 112 and 122 respectively. However, because of the larger display area, the images presented on the displays 312 and 422 may be clearer and easier to see than the images presented on the displays 112 and 122 respectively.

In another example embodiment, the vehicle 100 includes displays 112, 122, 312 and 422. Displays 112 and 312 are positioned to the left of the centerline of the steering wheel 160. Displays 122 and 422 are positioned to the right of the centerline of the steering wheel 160. As the vehicle is operated in the forward direction, the video data from the cameras 110 and 120 are presented on the displays 112 and 122 respectively. When the driver operates the turn signal control 230 to activate the left turn signal 140, the camera 110 switches to a higher resolution. The video data captured by the camera 110 is presented on the display 312 thereby providing higher resolution images on a display with a larger display area. The video data from the camera 110 may also be presented on the display 112 also at the higher resolution. When the driver operates the turn signal control 230 to activate the right turn signal 150, the camera 120 switches to a higher resolution. The video data captured by the camera 120 is presented on the display 422, which also provides the higher resolution images on a display with a larger display area than the display 122. The video data from the camera 120 may also be presented on the display 122 at the higher resolution.

While the indicators are not activated, the displays 312 and 422 may display other information such as information related to the operation of the automobile (e.g., speedometer, odometer, HVAC, economy and so forth), the infotainment system (e.g., channel, playlist, current program), status (e.g., battery charge, temperature) while the displays 112 and 122 present the video data from the cameras 110 and 120 respectively.

In an example embodiment, the display area of display 112 is about 4.5 inches in width and 3 inches in height while the display area of the display 312 is about 6 inches in width and 4 inches in height. The lower resolution of the camera 110 is 480 pixels×272 pixels while the higher resolution is 800 pixels×480 pixels. The display 112 is capable of presenting the captured video data at both 480 pixels×272 pixels and 800 pixels×480 pixels. The display 312 is capable of presenting the captured video data at a resolution of at least 800 pixels×480 pixels. In another implementation, display 312 is between 10 inches and 13 inches in width, 7 inches and 10 inches in height, and is capable of presenting video data up to a resolution of around 1366 pixels×768 pixels.

The cameras and/or the displays are not limited to the resolutions discussed herein. The sizes of the displays and/or their display areas are not limited to the sizes and/or areas discussed herein.

In another example embodiment, the displays 112, 122, 312 and/or 422 are replaced by the display 510. As best shown in FIGS. 5-8, the video data captured by the camera 110 is presented on a portion 520 of the display area of the display 510, while the video data captured by the camera 120 is presented on the portion 530 of the display 510. The area of the portion 520 and the portion 530 may change in accordance with the operation of the vehicle. For example, in an example embodiment, when the left turn signal 140 is active, the size of the portion 520 increases to be the portion 620 while the size of the portion 530 decreases to be the portion 630. The portion 620 is larger than the portion 630 and positioned more centrally (e.g., closer to steering wheel centerline) than the portion 630 thereby making it easier for the driver to see. When the right turn signal 150 is active, the size of the portion 520 decreases to be the portion 720 while the size of the portion 530 increases to be the portion 730. The portion 730 is larger than the portion 720 and positioned more centrally than the portion 720 thereby making it easier for the driver to see. When the vehicle is placed in reverse to move backwards, the video data captured by the camera 180 or 980 may be presented on the display 510 in the whole portion 810.

Changing the portion of the display area of the display 510 used to present video data may allow the video data captured at a higher resolution to be presented on a larger portion of the display area thereby providing a more detailed image to the driver.

In Operation

As discussed above, in operation the cameras 110, 120, 180 and/or 980 capture video data from the viewpoint of their respective locations on the vehicle 100. The video data for the respective cameras are provided to displays 112, 122, 130, 312, 422 and/or 510. The cameras 110, 120, 180 and/or 980 are adapted to capture video data at one or more resolutions. The cameras 110, 120, 180 and/or 980 are adapted to capture video data in one or more fields-of-view (e.g., narrow, wide). The cameras 110, 120, 180 and/or 980 are not limited to capturing data in one or two fields-of-view, but may capture video data in three or four or five or more fields of view.

The displays 112, 122, 130, 312, 422 and/or 510 are adapted to present the video data from the respective cameras. The displays 112, 122, 130, 312, 422 and/or 510 are adapted to present the video data at one or more resolutions. In an example implementation, the video data from any camera may be presented on any display at any resolution.

A camera may change resolution and/or its field-of-view in accordance with the operation of the vehicle and/or in response to an action taken by the driver as discussed above.

In a first example embodiment, a system for capturing and presenting video data with respect to a vehicle includes the camera 110 and the display 112. The camera 100 has a field-of-view (e.g., 910, 920). The camera 110 is adapted to capture the video data within the field-of-view (e.g., 910, 920) at a first resolution or a second resolution. The second resolution is greater than the first resolution. The camera 110 is adapted to be mounted on the vehicle 100. The camera 110 is adapted to be positioned to orient the field-of-view (e.g., 910, 920) of the camera rearward along a side of the vehicle 100. The display 112 is adapted to present the video data at the first resolution or the second resolution. The display 112 is adapted to be mounted inside the vehicle 100. The display 112 is adapted to be oriented for viewing by a driver of the vehicle. While the left turn signal 140 of the vehicle 100 is not active, the camera 110 captures the video data at the first resolution and the display 112 presents the video data at the first resolution. While the left turn signal 140 of the vehicle 100 is activated, the camera 110 captures the video data at the second resolution and the display 112 presents the video data at the second resolution.

In the first example embodiment, the first resolution is at least 480 pixels×272 pixels. The second resolution is at least 800 pixels×480 pixels. In another example embodiment, the second resolution is at least 1366 pixels×768 pixels.

In the first example embodiment, a width of a display area of the display 112 is between 3 and 5 inches and a height of the display area of the first display is between 2 and 4 inches. While the display 112 presents the video data at the first resolution, the video data is presented on only a portion of a display area of the display 112. While the display 112 presents the video data at the second resolution, the video data is presented on all of the display area of the display 112.

In the first example embodiment, the field-of-view includes a horizontal field-of-view. While the turn signal 140 of the vehicle 100 is not activated, the horizontal field-of-view of the camera 110 is between 30 and 45 degrees (e.g., angle 912). While the turn signal 140 of the vehicle 100 is activated, the horizontal field-of-view of the camera is between 60 and 90 degrees (e.g., angle 922).

In the first example embodiment, the field-of-view includes a vertical field-of-view. While the turn signal 140 of the vehicle is not activated, the vertical field-of-view of the camera 110 is between 30 and 60 degrees (e.g., angle 1222). While the turn signal 140 of the vehicle is activated, the vertical field-of-view of the camera 110 is between 70 and 120 degrees (e.g., angle 1010).

In the first example embodiment, the field-of-view includes a vertical and a horizontal field-of-view. While the turn signal 140 of the vehicle 100 is not activated, the vertical field-of-view of the camera 110 is between 30 and 60 degrees (e.g., angle 1222) and the horizontal field-of-view of the camera 110 is between 30 and 45 degrees (e.g., angle 912). While the turn signal 140 of the vehicle 100 is activated, the vertical field-of-view of the camera 110 is between 70 and 120 (e.g., 1010) degrees and the horizontal field-of-view of the camera 110 is between 60 and 90 degrees (e.g., angle 922).

In a second example embodiment, the system for capturing and presenting video data includes the camera 110, the display 112 in the display 312. The camera 110 has a field-of-view (e.g., 910, 920). The camera 110 is adapted to capture the video data within the field-of-view (e.g., 910, 920) at a first resolution or a second resolution. The second resolution is greater than the first resolution. The camera 110 is adapted to be mounted on the vehicle 100. The camera 110 is adapted to be positioned to orient the field-of-view (e.g., 910, 920) of the camera rearward along a side of the vehicle 100. The display 112 is adapted to present the video data at the first resolution or the second resolution. The display 312 adapted to present the video data at the second resolution. The displays 112 and 312 are adapted to be mounted inside the vehicle 100. The displays 112 and 312 are adapted to be oriented for viewing by the driver of the vehicle. While the turn signal 140 of the vehicle is not activated, the camera 110 captures the video data at the first resolution and the display 112 presents the video data at the first resolution. While the turn signal 140 of the vehicle is activated, the camera 110 is adapted to capture the video data at the second resolution and the display 312 is adapted to present the video data at the second resolution.

In the second example embodiment, while the turn signal 140 of the vehicle 100 is activated, the display 112 is adapted to also present the video data at the second resolution. The display area of the display 312 is greater than the display area of the display 112.

In the second example embodiment, the display 112 is adapted to be positioned a first distance away from a centerline of a steering wheel 160 of the vehicle 100. The display 312 is adapted to be positioned a second distance away from the centerline of the steering wheel 160 of the vehicle 100. The first distance is greater than the second distance.

In the second example embodiment, a width of a display area of the display 312 is between 5 and 9 inches. A height of the display area of the display 312 is between 3 and 6 inches. In another example embodiment, a width of a display area of the display 312 is between 9 and 13 inches. A height of the display area of the display 312 is between 6 and 10 inches.

Example Method

The system for capturing and presenting the video data with respect to the vehicle 100 may perform one or more methods to capture the video data using one or more cameras (e.g., 110, 120, 180, 980) and to present the video data using one or more displays (e.g., 112, 122, 312, 422, 510).

In an example method the system for capturing and presenting the video data with respect to the vehicle 100 performs the method. The method includes detecting whether the turn signal (e.g., 140, 150) of the vehicle 100 is active or not active. While the turn signal (e.g., 140, 150) is not active: capturing the video data in a field-of-view (e.g., 910, 920, 930, 940, 1120, 1124) of a camera (e.g., 110, 120) at a first resolution and presenting (e.g., displaying, showing) the video data on a display (e.g., 112, 122, 312, 422, 510) at the first resolution. The camera (e.g., 110, 120, 180, 980) is adapted to be mounted to the vehicle. The camera (e.g., 110, 120) is adapted to be positioned to orient the field-of-view (e.g., 910, 920, 930, 940) of the camera rearward and along a side of the vehicle. The display (e.g., 112, 122, 312, 422, 510) is adapted to be mounted inside the vehicle 100. The display (e.g., 112, 122, 312, 422, 510) is adapted to be oriented for viewing by the driver of the vehicle 100. While the turn signal (e.g., 140, 150) is active: capturing the video data in the field-of-view (e.g., 910, 920, 930, 940) at a second resolution and presenting the video data on the display (e.g., 112, 122, 312, 422, 510) at the second resolution.

In an example method, while the turn signal is not active, presenting comprises presenting the video data on a first portion (e.g., 520 or 530) of a display area of the display (e.g., 510) at the first resolution. While the turn signal is active, presenting comprises presenting the video data on a second portion (e.g., 620 or 730) of the display area of the display (e.g., 510) at the second resolution. The second portion (e.g., 620 or 730) of the display area is greater than the first portion (e.g., 520 or 530) of the display area.

In an example method, capturing includes capturing the video data in a horizontal field-of-view of the camera. While the turn signal of the vehicle is not active, the horizontal field-of-view of the camera is between 30 and 45 degrees (e.g., 912, 932). While the turn signal of the vehicle is active, the horizontal field-of-view of the camera is between 60 and 90 degrees (e.g., 922 942).

In an example method, capturing includes capturing the video data in a vertical field-of-view of the camera. While the turn signal of the vehicle is not active, the vertical field-of-view of the camera is between 30 and 60 degrees (e.g., 1020). While the turn signal of the vehicle is active, the vertical field-of-view of the camera is between 70 and 120 degrees (e.g., 1010).

In an example method, capturing includes capturing the video data in a vertical field-of-view and a horizontal field-of-view of the camera. While the turn signal of the vehicle is not active: the vertical field-of-view of the camera is between 30 and 60 degrees (e.g., 1020) and the horizontal field-of-view of the camera is between 30 and 45 degrees (e.g., 912, 932). While the turn signal of the vehicle is active: the vertical field-of-view of the camera is between 70 and 120 degrees (e.g., 1010) and the horizontal field-of-view of the camera is between 60 and 90 degrees (e.g., 922, 942).

In another example method, the system further detects whether the control 190 is active. While the control 190 is active, regardless of whether the turn signal of the vehicle is active or not active, the system performs capturing the video data in the field-of-view (e.g., 910, 920, 930, 940) at the second resolution and presenting the video data on the display (e.g., 112, 122, 312, 422, 510) at the second resolution.

In an example method the system for capturing and presenting the video data with respect to the vehicle 100 performs the method. The method includes detecting whether the turn signal (e.g., 140, 150) of the vehicle 100 is active or not active. While the turn signal (e.g., 140, 150) is not active: capturing the video data in a field-of-view (e.g., 910, 920, 930, 940) of a camera (e.g., 110, 120) at a first resolution and presenting the video data on a first display (e.g., 112, 122) at the first resolution. The camera (e.g., 110, 120) is adapted to be mounted to the vehicle. The first display (e.g., 112, 122) is adapted to be mounted inside the vehicle 100. The first display (e.g., 112, 122) is adapted to be oriented for viewing by a driver of the vehicle 100. While the turn signal (e.g., 140, 150) of the vehicle is active: capturing the video data in the field-of-view (e.g., 910, 920, 930, 940) at a second resolution and presenting the video data on a second display (e.g., 312, 422) at the second resolution. The second display (e.g., 312, 422) is adapted to be mounted inside the vehicle 100. The second display (e.g., 312, 422) is adapted to be oriented for viewing by the driver of the vehicle. The second resolution is higher than the first resolution. The display area of the second display (e.g., 312, 422) is greater than the display area of the first display (e.g., 112, 122).

Afterword

The foregoing description discusses embodiments (e.g., implementations), which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments have been described, the scope of the invention is intended to be measured by the claims as set forth below. In the claims, the term "provided" is used to definitively identify an object that is not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

What is claimed is:

1. A method for capturing and presenting a video data, the method performed by a system for capturing and presenting the video data with respect to a vehicle, the method comprising:

detecting that a turn signal of the vehicle is not active;
while the turn signal is not active:
    capturing the video data in a first field-of-view of a camera at a first resolution; and
    presenting the video data having the first field-of-view at the first resolution in a first display area of a display;
detecting that the turn signal of the vehicle is active; and
while the turn signal is active:
    capturing the video data in a second field-of-view at a second resolution, the second field-of-view wider than the first field-of-view and includes at least a portion the first field-of-view, the second resolution greater than the first resolution;
    presenting the video data having the second field-of-view at the second resolution in the first display area on the display, wherein:
the display is adapted to be mounted inside the vehicle;
the display is adapted to be oriented for viewing by a driver of the vehicle;
the camera is adapted to be mounted to the vehicle;
the camera is adapted to be positioned to orient the first field-of-view and the second field-of-view of the camera rearward and along a side of the vehicle; and the display adapted to detect the video data at the first resolution and the video data at the second resolution and to automatically present the video data at the first resolution or the second resolution respectively.

2. The method of claim 1, wherein:
capturing the video data in the first field-of-view comprises capturing the video data in a first horizontal field-of-view of the camera;
capturing the video data in the second field-of-view comprises capturing the video data in a second horizontal field-of-view of the camera;
the first horizontal field-of-view of the camera is between 30 and 45 degrees; and
the second horizontal field-of-view of the camera is between 60 and 90 degrees.

3. The method of claim 1, wherein:
capturing the video data in the first field-of-view comprises capturing the video data in a first vertical field-of-view of the camera;
capturing the video data in the second field-of-view comprises capturing the video data in a second vertical field-of-view of the camera;
the first vertical field-of-view of the camera is between 30 and 60 degrees; and
while the turn signal of the vehicle is active, the second vertical field-of-view of the camera is between 70 and 120 degrees.

4. The method of claim 1, wherein:
capturing the video data in the first field-of-view comprises capturing the video data in a first vertical field-of-view and a first horizontal field-of-view of the camera;
capturing the video data in the second field-of-view comprises capturing the video data in a second vertical field-of-view and a second horizontal field-of-view of the camera;
the first vertical field-of-view of the camera is between 30 and 60 degrees;
the first horizontal field-of-view of the camera is between 30 and 45 degrees;
the second vertical field-of-view of the camera is between 70 and 120 degrees; and
the second horizontal field-of-view of the camera is between 60 and 90 degrees.

5. The method of claim 1, further comprising:
while a control operated by a user is active, regardless of whether the turn signal of the vehicle is active or not active:
capturing the video data in the second field-of-view at the second resolution; and
presenting the video data having the second field-of-view on the display at the second resolution.

6. A system for capturing and presenting a first video data and a second video data with respect to a vehicle, the system comprising:
a first camera adapted to capture the first video data within a first field-of-view at a first resolution or within a second field-of-view at a second resolution, the second field-of-view wider than the first field-of-view, the second resolution greater than the first resolution, the first camera adapted to be mounted on the vehicle, the first camera adapted to be positioned to orient the first field-of-view and the second field-of-view of the first camera rearward and along a left side of the vehicle;
a first display adapted to present the first video data at the first resolution or the second resolution in a first display area of the first display, the first display adapted to be mounted inside the vehicle forward of a steering wheel of the vehicle and a first distance to a left of a centerline of the steering wheel, the first display adapted to be oriented for viewing by a driver of the vehicle;
a second camera adapted to capture the second video data within a third field-of-view at the first resolution or within a fourth field-of-view at the second resolution, the fourth field-of-view wider than the third field-of-view, the second camera adapted to be mounted on the vehicle, the second camera adapted to be positioned to orient the third field-of-view and the fourth field-of-view of the second camera rearward and along a right side of the vehicle; and
a second display adapted to present the second video data at the first resolution or the second resolution in a second display area of the second display, the second display adapted to be mounted inside the vehicle forward of the steering wheel and the first distance to a right of the centerline of the steering wheel, thereby positioning the first display and the second display symmetrically with respect to the centerline of the steering wheel, the second display adapted to be oriented for viewing by the driver of the vehicle; wherein:
while a left turn signal of the vehicle is not active:
the first camera captures the first video data in the first field-of-view at the first resolution; and
the first display presents the first video data at the first resolution in the first display area;
while a right turn signal of the vehicle is not active:
the second camera captures the second video data in the third field-of-view at the first resolution; and
the second display presents the second video data at the first resolution in the second display area;
while the left turn signal of the vehicle is active:
the first camera captures the first video data in the second field-of-view at the second resolution; and
the first display presents the first video data at the second resolution in the first display area; and
while the right turn signal of the vehicle is active:
the second camera captures the second video data in the fourth field-of-view at the second resolution; and
the second display presents the second video data at the second resolution in the second display area.

7. The system of claim 6, wherein the first resolution is at least 480 pixels×272 pixels.

8. The system of claim 6, wherein the second resolution is at least 800 pixels×480 pixels.

9. The system of claim 6, wherein the second resolution is at least 1366 pixels×768 pixels.

10. The system of claim 6, wherein:
the first field-of-view comprises a first horizontal field-of-view;
the second field-of-view comprises a second horizontal field-of-view;
while the left turn signal of the vehicle is not active, the first horizontal field-of-view of the first camera is between 30 and 45 degrees; and
while the left turn signal of the vehicle is active, the second horizontal field-of-view of the first camera is between 60 and 90 degrees.

11. The system of claim 6, wherein:
the first field-of-view comprises a first vertical field-of-view;
the second field-of-view comprises a second vertical field-of-view;

while the left turn signal of the vehicle is not active, the first vertical field-of-view of the first camera is between 30 and 60 degrees; and while the left turn signal of the vehicle is active, the second vertical field-of-view of the first camera is between 70 and 120 degrees.

12. The system of claim 6, wherein:

the first field-of-view comprises a first vertical field-of-view and a first horizontal field-of-view;

the second field-of-view comprises a second vertical field-of-view and a second horizontal field-of-view;

while the left turn signal of the vehicle is not active, the first vertical field-of-view of the first camera is between 30 and 60 degrees and the first horizontal field-of-view of the first camera is between 30 and 45 degrees; and while the left turn signal of the vehicle is active, the second vertical field-of-view of the first camera is between 70 and 120 degrees and the second horizontal field-of-view of the first camera is between 60 and 90 degrees.

* * * * *